US011442799B2

(12) United States Patent
Hajdu

(10) Patent No.: US 11,442,799 B2
(45) Date of Patent: Sep. 13, 2022

(54) METHOD AND APPARATUS FOR CONTROLLING A PRINTER UPON RECEIVING A PRINT ERROR RECORDED IN A PRINTER EVENT LOG

(71) Applicant: KYOCERA Document Solutions, Inc., Osaka (JP)

(72) Inventor: Zsolt Hajdu, Torrance, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 66 days.

(21) Appl. No.: 17/153,771

(22) Filed: Jan. 20, 2021

(65) Prior Publication Data

US 2022/0229715 A1     Jul. 21, 2022

(51) Int. Cl.
*G06F 15/00* (2006.01)
*G06F 11/07* (2006.01)
*H04N 1/00* (2006.01)

(52) U.S. Cl.
CPC ...... *G06F 11/0733* (2013.01); *G06F 11/0727* (2013.01); *G06F 11/0781* (2013.01); *H04N 1/00029* (2013.01); *H04N 1/00037* (2013.01); *H04N 1/00076* (2013.01)

(58) Field of Classification Search
None
See application file for complete search history.

(56) References Cited

U.S. PATENT DOCUMENTS

| 2003/0112452 | A1* | 6/2003 | McIntyre | G06F 11/0748 358/1.15 |
| 2008/0012892 | A1* | 1/2008 | Imoto | G06K 15/002 347/19 |

\* cited by examiner

*Primary Examiner* — Andrew H Lam
(74) *Attorney, Agent, or Firm* — Rowan Tels LLC

(57) ABSTRACT

A method of retrieving printer error logs from a printer or a multi-function printer with a printer memory buffer and internal non-volatile storage involves receiving a print error. A processor determines if a print error is a fatal error or a non-fatal error. On condition the print error is a non-fatal error, the event log located in the printer memory buffer is printed using the printer or the multi-function printer. On condition the print error is a fatal error, the processor determines if there is enough storage capacity to save the fatal error into the internal non-volatile storage. On condition there is enough storage capacity, the processor saves the event log into the internal non-volatile storage. The user is then instructed to power cycle the printer or the multi-function printer.

20 Claims, 8 Drawing Sheets

METHOD AND APPARATUS FOR CONTROLLING A PRINTER UPON RECEIVING A PRINT ERROR RECORDED IN A PRINTER EVENT LOG

BACKGROUND

Software that runs inside printers or multi-function printers may generate an internal detailed log about the events that occur while the printer is printing. "Log" refers to a sequence of internal events that describe how a printer processes the input and generates the output. This usually means multiple logs that correspond to different software subsystems in the firmware. Logs may also be referred to as one global system log. "Printer" refers to printing devices that are equipped with internal non-volatile storage. In the case of an error this storage can be used to temporarily save the event log content. "Event log" refers to a record of the operations performed by various functions of an electronic device, as well as records of the results of these operations. Event logs may include time and date information as well as classification codes for each error captured in the event log that may be utilized to understand the components, conditions, and causes of an error. These logs can be useful for software engineers to analyze and determine reasons for print errors. Typically, these logs are not accessible through the printer's control panel, and may only be accessible to technicians, using a special utility or USB drive. In some printers, a network connection may be required to obtain the log file from the printer.

These logs are typically stored in a memory block that is continually recycled, meaning that when the memory block is filled up with messages, the newer messages may start to overwrite the oldest messages at the beginning of the buffer. When an error occurs at a user's site/office, the user typically has to file an error report of some kind. Then an engineer has to reproduce the problem in order to be able to capture the logs to be able to investigate the problem. Some of these intermittent problems can be hard to reproduce by the engineers, preventing the engineers from determining the cause of a print error. Therefore, it should be understood there is a need for retrieving the event logs that corresponds to the very first occurrence of a print error.

BRIEF SUMMARY

A method of retrieving printer event logs from a printer or a multi-function printer with a printer memory buffer and internal non-volatile storage involves receiving a print error while processing a print job or scanning a document. A processor makes determination if a print error is a fatal error or a non-fatal error. "Print error" refers to a software or hardware failure that occurs during a print job that prevents the print job from completing successfully. Examples of print errors include non-fatal errors where the print job may be prevented from printing a page or document but is still able to print, and fatal errors where the printer is unable to complete any print jobs until the error is resolved. For a multi-function printer, print errors may include, for example, errors that occur while scanning or sending/receiving faxes. "Non-fatal error" refers to an error condition that doesn't prevent the printer from generating output. For example, a problem with the software component that interprets received print jobs can prevent the printer from processing input print jobs, but the printer may still be able to print internally generated pages. On condition the print error is a non-fatal error, the non-fatal error content from the event log located in the printer memory buffer is printed using the printer or the multi-function printer. On condition the print error is a fatal error, the processor determines if there is enough storage capacity to save the event log into the internal non-volatile storage. On condition there is enough storage capacity, the processor saves the event log into the internal non-volatile storage. The method triggers the construction of a User Interface (UI), the UI instructing the user to power cycle the printer or the multi-function printer.

A printing apparatus includes a processor, a printer memory buffer, internal non-volatile storage, and memory. The memory stores instructions that, when executed by the processor, configure the apparatus to perform actions to retrieve printer event logs. These instructions, when executed by the processor, configure the printing apparatus to handle print errors as disclosed herein.

A non-transitory computer-readable storage medium, the computer-readable storage medium including instructions that when executed by a printer or a multi-function printer, cause the printer or the multi-function printer to retrieve printer event logs. These instructions, when executed by a computer, cause the printer or multi-function printer to handle print errors as disclosed herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
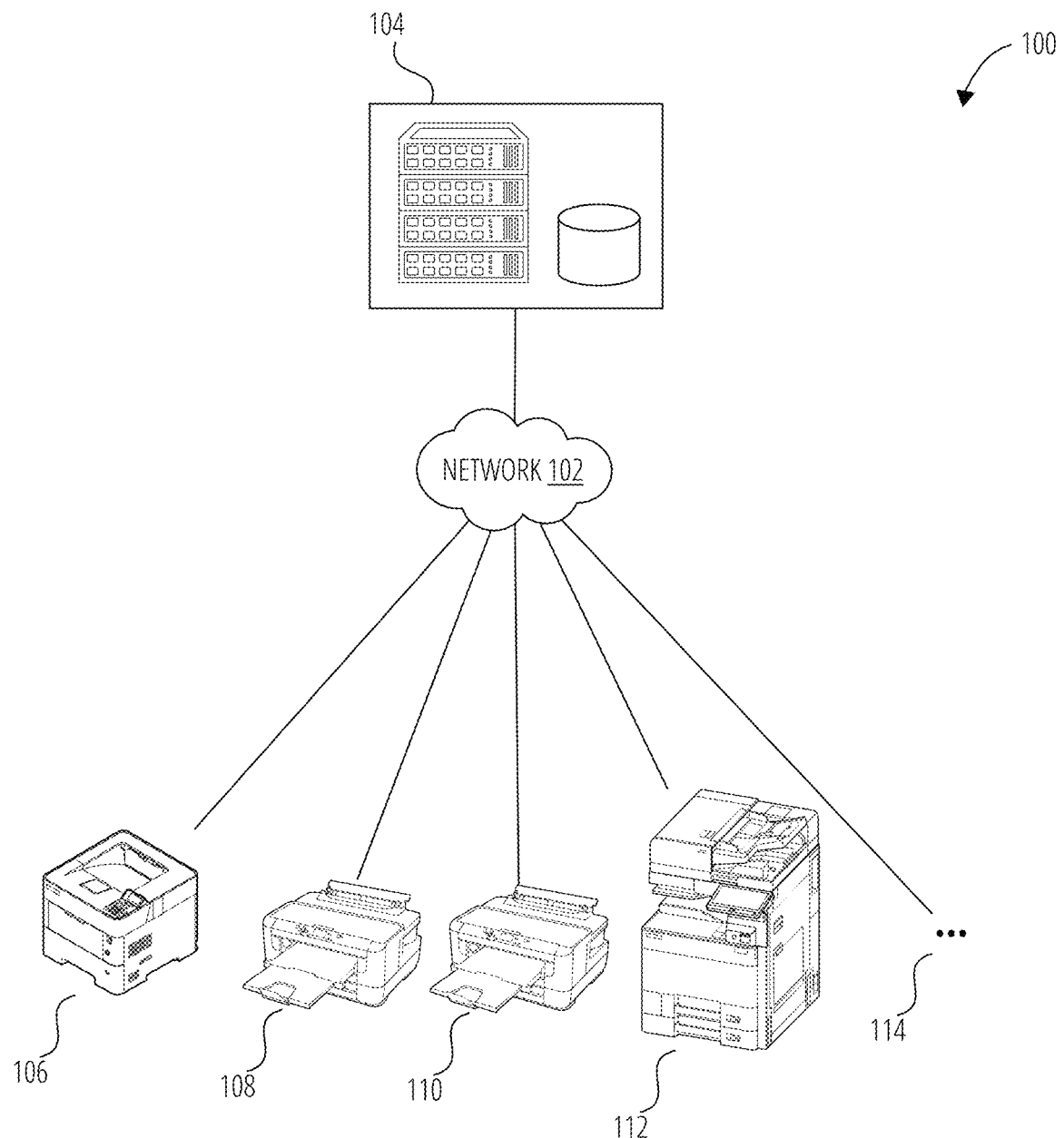
FIG. 1 illustrates a system 100 in accordance with one embodiment.

A system and method for retrieving printer event logs retrieves event logs from printers or multi-function printers. "Multi-function printer" (MFP) refers to printing device(s) which incorporate the functionality of multiple devices in one (e.g., printer, scanner, fax, email, photocopier). MFPs may be equipped with internal non-volatile storage. In case of an error this storage can be used to temporarily save the event log content. These printers or multi-function printers include a printer memory buffer and internal non-volatile storage. "Printer memory buffer" refers to is a region of a physical memory storage used to temporarily store data while it is being moved from one place to another. Typically, the data is stored in a buffer as it is retrieved from an input device (e.g., communications module, system bus, image scanner, etc.) or just before it is sent to an output device (e.g., image forming unit in a printer). A majority of buffers are implemented in software, which typically use the faster RAM to store temporary data, due to the much faster access time compared with hard disk drives. A printer or multi-function printer may receive a print error while processing a print job. The printer or multi-function printer may then determine if the print error is a fatal error or a non-fatal error. "Fatal error" refers to the type of error condition that prevents the printer from continuing generating output. The error may be related to a mechanical system or computing system error preventing a printing system from performing print jobs. Mechanical system related fatal errors may be caused by mechanical issues such as component failure, paper jams, etc. Computing system fatal errors may include failures due to the computer hardware or software related failures. Hardware failures may lead to a system crash, stop error, kernel error, or bug check, that may cause the system to halt because it has reached a condition where it can no longer operate safely. The software related failures may be a fatal exception error that causes a program to abort. Upon determining that the printer error is a non-fatal error, the printer or multi-function printer may print the content from the event log located in the printer memory buffer. If the print error is determined to be a fatal error, the printer or multi-function printer determines if there is enough storage capacity to save the event log into the internal non-volatile storage. If there is enough storage capacity, the printer or multi-function printer may save the event log into the internal non-volatile storage. The system then triggers the construction of a User Interface (UI), the UI instructing a user to power cycle the printer or the multi-function printer.

When a non-fatal error occurs during a print job, a log doesn't necessarily have to be saved, since it can be printed before the power is cycled. When a printing error occurs, the control panel of the printer usually displays the error code or description. In addition to the current information, the control panel may have a button that the user can use to trigger the printing of the log. After the log is printed, the user would be instructed to cycle the power to the printer.

When a fatal error occurs during a print job, the control panel of the printer may display the error code or description. In addition to the displayed information, the control panel may have a button that the user may use to trigger the saving of the log to the non-volatile storage.

When the process is done, the error screen may instruct the user to cycle the printer's power. As part of the powerup sequence, the printer may check if event logs are stored from the previous shutdown in a specific directory. If a log is found, then the printer may internally covert the log content to text output using an internal font.

The system and method may provide a way for non-technicians to capture the event log of the printer or multi-function printers without special tools or knowledge. Additionally, computer software, hardware, and networks may be utilized in a variety of different system environments, including standalone, networked, remote-access (aka, remote desktop), virtualized, and/or cloud-based environments, among others.

FIG. 1 is a block diagram illustrating an example system 100 according to an example embodiment of the present disclosure. System 100 may include one or more printing devices (printing device 106, printing device 108, printing device 110, printing device 112, and printing device 114) and a server 104, which may be connected via a network 102. In some examples, system 100 may include more or fewer printing devices than are shown in FIG. 1, may include additional servers and/or computing devices, and/or may include one or more other systems or devices in addition to or instead of those shown in FIG. 1.

The printing devices may include one or more multi-function printing devices and/or stand-alone printing devices. A given printing device may be configured to perform one or more functions such as printing, scanning, emailing, storing, modifying, receiving, or transmitting one or more documents and/or files. In some examples, printing devices may include one or more computing devices. In some examples, one or more of the printing devices may be connected to one or more personal computers, laptops, servers, handheld devices, and/or other computing devices and systems, which may be used in connection with the printing device to perform one or more actions, such as those described above.

Each printing device may be configured to perform one or more steps, actions, or functions described herein. For example, printing device 106 may communicate with server 104, to transmit and/or receive data or information via network 102 including time intervals, numbers of printed pages, numbers of errors, and other related information.

Server 104 may include a cloud based server, for example, that can perform one or more tasks to manage and/or maintain printing devices. Server 104 may communicate with printing devices to transmit or receive data. For instance, in some examples server 104 may transmit a command to the one or more printing devices to reset, install updates, or perform one or more printing or maintenance functions or operations. In other examples, server 104 may receive data from the one or more printing devices, such as a page count (i.e., number of pages printed), an error count, one or more error messages, or data corresponding to a page count, error count, and/or error message.

In some examples, server 104 may be configured to perform one or more functions or steps of the example methods and systems disclosed herein. For instance, server 104 may determine a time interval, number of pages printed, and number of printing-device errors for one or more printing devices. Server 104 may also determine a ratio of printed pages per printing-device error for one or more printing devices over a given time interval. Further, server 104 may determine one or more Markov chain coefficients based on the time interval, number of pages printed, number of printing-device errors, and/or determined ratio. Server 104 may then determine an operational status of one or more printing devices, and take one or more actions based on the determined operational status.

Server 104 may include one or more computing devices or systems (not shown), and may be consolidated in a single physical location, or distributed across two or more physical locations. Server 104 may include hardware, software, and/or firmware configured to carry out one or more functions or acts described herein.

Network 102 in the system 100 may include one or more wired or wireless connections that support communication between the devices of system 100. In some examples, network 102 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 102 may be configured to allow communication between server 104 and one or more printing devices, between the printing devices themselves, and/or between one or more other devices or systems and the system 100. Such communications may include commands, requests, and/or data corresponding to documents, printing-device errors, and/or other data.

Figure 2:
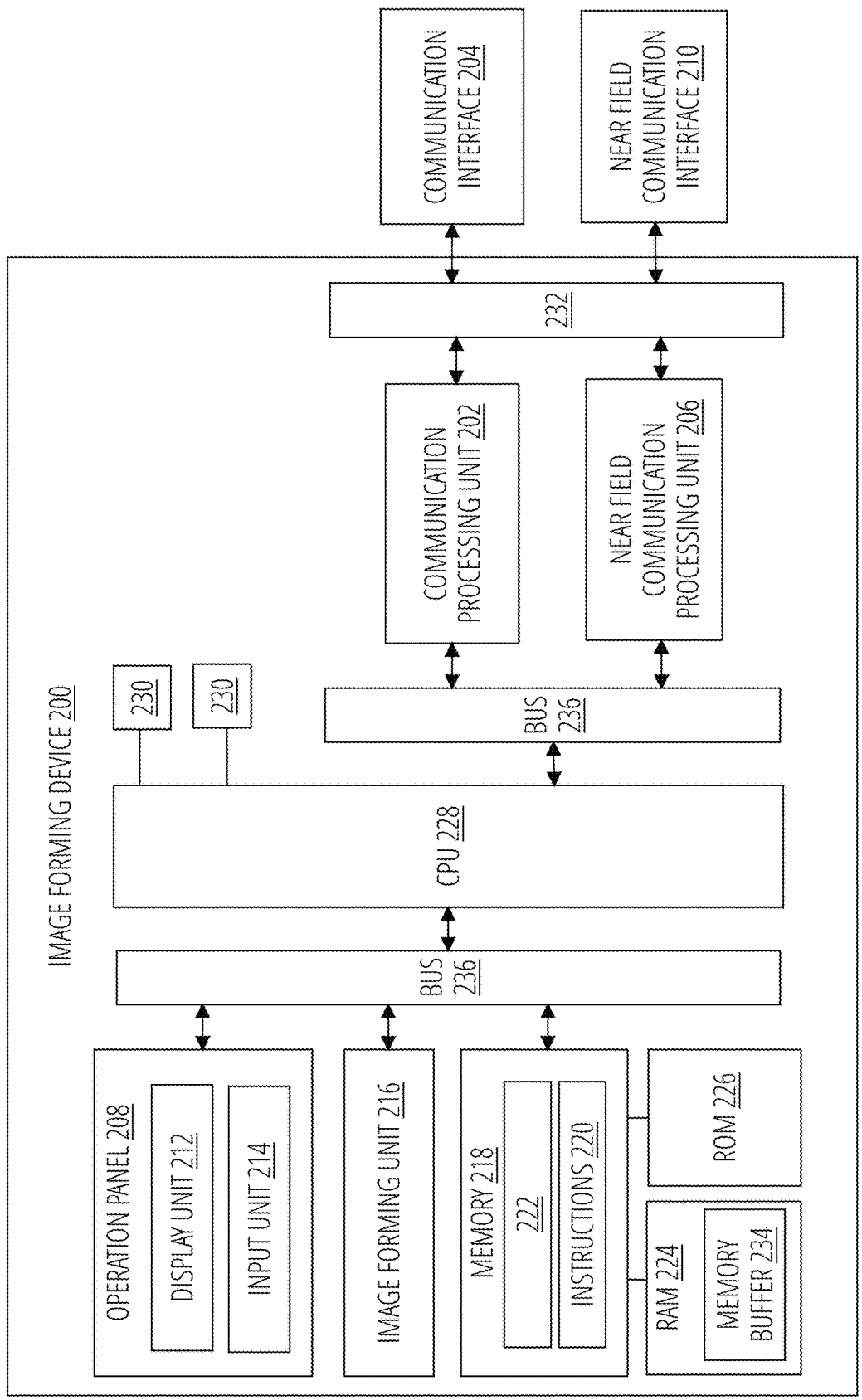
FIG. 2 illustrates an image forming device 200 in accordance with one embodiment.

Referring now to FIG. 2, the image forming device 200 may be described in more detail in terms of the machine elements that provide functionality to the systems and methods disclosed herein. The components of the image forming device 200 may include, but are not limited to, one or more processors or processing units (processor 228), a system memory 218, and a system bus 236 that may couple various system components including the system memory 218 to the processor 228. The image forming device 200 may typically include a variety of computer system readable media. Such media may be chosen from any available media that is accessible by the image forming device 200, including non-transitory, volatile and non-volatile media, removable and non-removable media. The system memory 218 may include one or more image forming device readable media in the form of volatile memory, such as a random access memory (RAM 224) and/or a cache memory (ROM 226). By way of example only, the system memory 218 may be provided for reading from and writing to a non-removable, non-volatile magnetic media device typically called a "hard drive". A printer memory buffer 234 is primarily allocated within the computer memory (RAM 224) or the storage disk. When multiple print jobs are sent to the image forming device 200, each of them is stored in a logical print queue within the printer memory buffer 234.

The system memory 218 may include at least one program product/utility (instructions 220) having a set (e.g., at least one) of program modules 222 that may be configured to carry out the functions of embodiments of the invention. The program modules 222 may include, but is not limited to, an operating system, one or more application programs, other program modules, and program data. Each of the operating systems, one or more application programs, other program modules, and program data or some combination thereof, may include an implementation of a networking environment. The program modules 222 may include procedures such as a page converter, rasterizer, compression code, page print scheduler, print engine manager, and similar printing applications (i.e., printer firmware). The program modules 222 generally carry out the functions and/or methodologies of embodiments of the invention as described herein.

An image forming unit 216 is configured to form an image on a sheet for a print job. In an example configuration, the image forming unit 216 may employ an electrophotographic method for forming the image on the sheet. This method may be utilized in image forming apparatuses such as printers and copying machines. The image forming unit 216 may include components such as a photoreceptor drum that supports an electrostatic latent image, a developing device that supplies the photoreceptor drum with toner to visualize the electrostatic latent image in a toner image, and a transfer device that transfers the toner image from the photoreceptor drum to a sheet. Furthermore, the image forming unit 216 may include components such as a paper tray or other paper feeding system.

The image forming device 200 may have one or more communication module 232. The communication module 232 may allow the image forming device 200 to communicate with one or more networks as a local area network (LAN), a general wide area network (WAN), wireless local area network (WLAN) and/or a public network. In accordance with one embodiment, the communication module 232 may include a communication processing unit 202 coupled to a communication interface 204. The communication processing unit 202 and the communication interface 204 may allow the image forming device 200 to communicate with one or more networks 102. These network 102 may be a local area network (LAN), a general wide area network (WAN), a wireless local area network, a public network, a cellular network as well as other type of networks. The communication module 232 may include a near field communication processing unit 206 coupled to a near field communication interface 210. The near field communication processing unit 206 and the near field communication interface 210 may allow the image forming device 200 to communicate with other electronic devices located near the image forming device 200 using Bluetooth, infrared or similar wireless communication protocols.

The image forming device 200 may include an operation panel 208. The operation panel may include a display unit 212 and an input unit 214 for facilitating human interaction with the image forming device 200. The display unit 212 may be any electronic video display, such as a LCD display, LED display and similar display types. The input unit 214 may include any combination of devices that allow users to input information into the operation panel 208, such as buttons, a keyboard, switches, and/or dials. In addition, the input unit 214 may include a touch-screen digitizer overlaid onto the display unit 212 that can sense touch and interact with the display unit 212.

The image forming device 200 may have one or more sensor 230. Each sensor 230 may be used to monitor certain operating conditions of the image forming device 200. Sensor 230 may be used to indicate a location of a paper jam, document mis-feed, toner level, as well as other operating conditions. The above is given as examples and should not be read in a limiting manner. Each sensor 230 may be coupled to the processor 228. When a sensor 230 detects an operational issue as may be disclosed below, the sensor 230 may send a signal to the processor 228. The processor 228 may generate an error alert associated with the operational issue. The processor 228 may transmit the error alert to an external device as disclosed below using one of the communication modules 232.

The image forming device 200 may be operated to receive a print error. The processor 228 may determine if the print error is a fatal error or a non-fatal error. The image forming device 200 may then print, using the image forming unit 216, the event log located in the printer memory buffer 234, on condition the print error is a non-fatal error. The processor 228 may then determine if there is enough storage capacity to save the event log into the internal non-volatile storage (ROM 226), on condition the print error is a fatal error. The processor 228 may then save the event log in the internal non-volatile storage (ROM 226), on condition there is enough storage capacity. The processor 228 may then operate the display unit 212 to instruct a user to power cycle the image forming device 200. In some configurations, the printer memory buffer 234 is associated with internal volatile storage (RAM 224).

In some configurations, an error screen may be presented to the user, through the display unit 212, and requesting an input from the user whether to save the event log in the internal non-volatile storage (ROM 226).

In some configurations, the image forming device 200 may be configured to determine if there is a saved event log, after the image forming device 200 has been power cycled. The image forming device 200 may then print the saved event log through the image forming unit 216 on condition that there is a saved event log and event log printing is enabled on image forming device 200.

In some configurations, the image forming device 200 may determine if there is paper in an input tray of its input trays.

In some configurations, the image forming device 200 may print as many pages of the event log as specified in a page limit setting in a configuration section of the printer or the multi-function printer. The image forming device 200 may delete the log file.

In some configurations, the user may enable event log printing through the image forming device 200, by using an override function, to print the saved event log. This may be done on condition that there is a saved event log and event log printing is not enabled on the image forming device 200

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, system memory 218) may be utilized. In the context of this disclosure, a computer readable storage medium may be any tangible or non-transitory medium that can contain, or store a program (for example, the program modules 222) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 3:
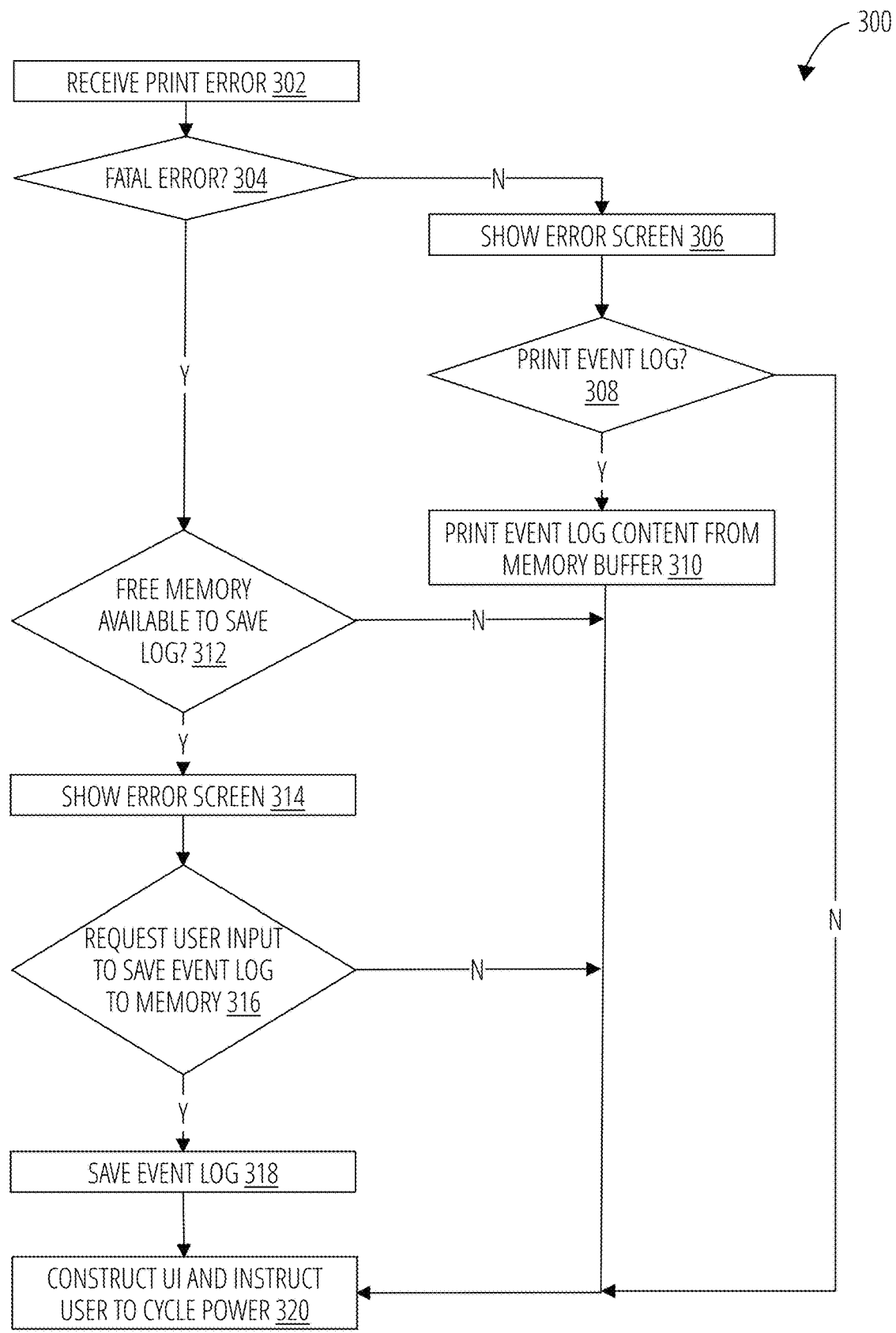
FIG. 3 illustrates a method 300 in accordance with one embodiment.

FIG. 3 illustrates a method 300 for retrieving printer event log in accordance with one embodiment. The method 300 for retrieving printer event log may be operated on a printer or a multi-function printer with a printer memory buffer and internal non-volatile storage. The method 300 involves receiving a print error (block 302). In decision block 304, the method 300 determines if the print error is a fatal error or a non-fatal error.

If the print error is not a fatal error, the method 300 displays an error screen (block 306) requesting user input to print the event log (decision block 308). If the user elects to print the event log, the event log located in the printer memory buffer (block 310) is printed using the printer or the multi-function printer. The method 300 may then move to block 320 and instruct the user to power cycle the printer or the multi-function printer. If the user does not elect to print the event log in decision block 308, the method 300 may move to block 320 and instruct the user to power cycle the printer or the multi-function printer.

If the print error is fatal, the method 300 moves to decision block 312 to determine if there is enough storage capacity to save the event log into the internal non-volatile storage. If there is not enough storage capacity to save the event log in the internal non-volatile storage, the method 300 moves to block 320 and instructs the user to power cycle the printer or the multi-function printer.

If the there is enough storage capacity to save the event log in the internal non-volatile storage, the method 300 moves to block 314, which shows an error screen informing the user of the fatal error and requesting whether the user wishes to save the event log within the internal non-volatile storage. The method 300 then moves to decision block 316, which requests an input from the user to save the event log in the internal non-volatile storage.

If the user does not wish to save the event log, the method 300 moves to block 320 and instructs the user to power cycle the printer or the multi-function printer. If the user wishes to save the event log, the method 300 moves to block 318 where the event log is saved in the internal non-volatile storage. The method 300 then moves to block 320 and instructs the user to power cycle the printer or the multi-function printer.

In some configurations, the printer memory buffer is associated with internal volatile storage.

In some configurations, the method may further involve determining if there is a saved event log, after power cycling the printer or the multi-function printer. "Power cycling" refers to the act of turning a piece of equipment, usually a computer, off and then on again. Reasons for power cycling include having an electronic device reinitialize its set of configuration parameters or recover from an unresponsive state of its mission critical functionality, such as in a crash or hang situation. The method may then print the saved event log, on condition there is a saved event log and event log printing is enabled on the printer or the multi-function printer.

In some configurations, the method may further involve determining if there is paper in an input tray of the printer or the multi-function printer. The method may also print as many pages of the event log as specified in a page limit setting in a configuration section of the printer or the multi-function printer. In some instances, the method may delete the log file. This may be done to free memory resources that may be limited on the printer or multi-function printer.

In some configurations, the method enables event log printing on the printer or the multi-function printer, by the user, using an override function and print the saved event log. This is done on condition there is a saved event log and event log printing is not enabled on the printer or the multi-function printer.

Figure 4:
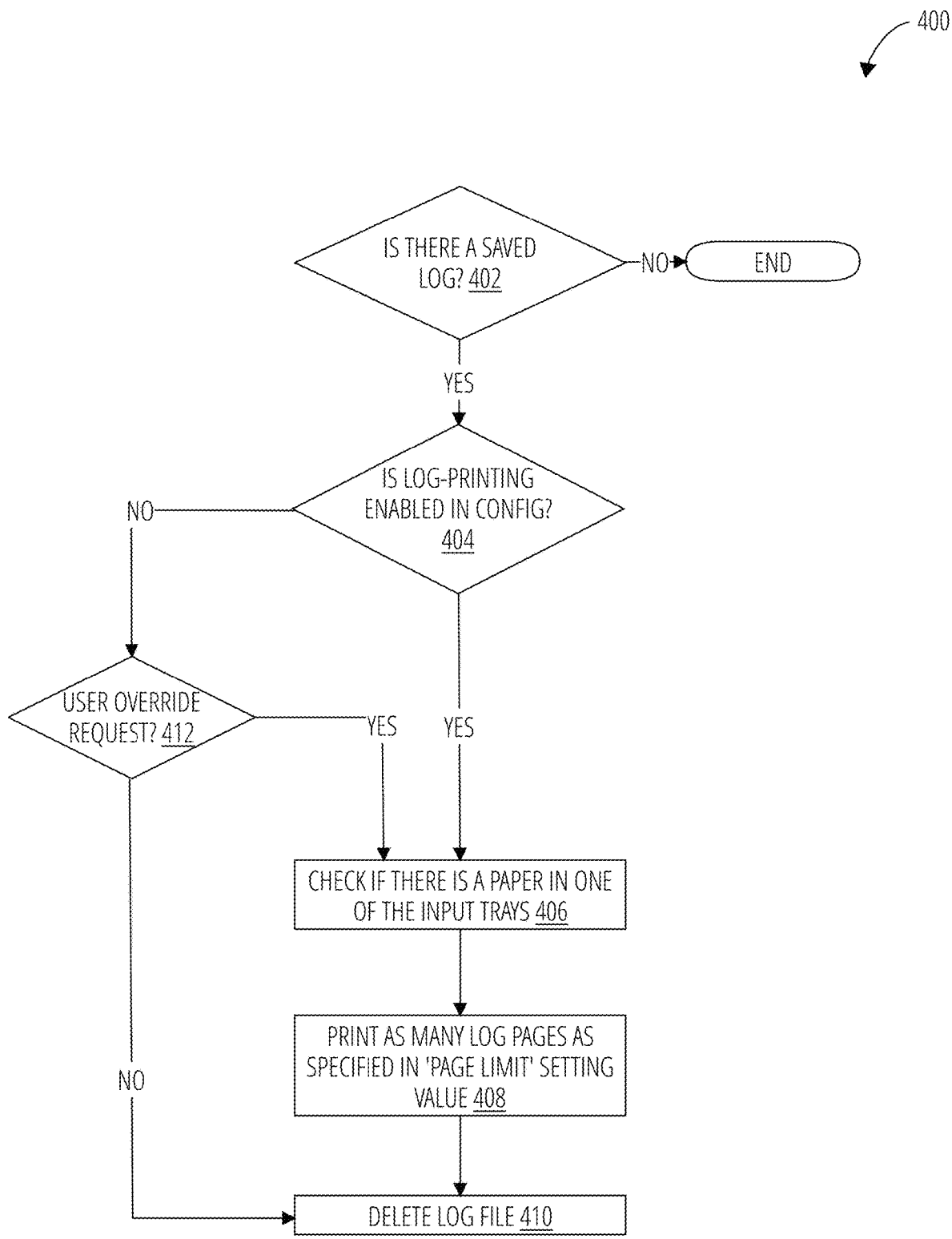
FIG. 4 illustrates a method 400 in accordance with one embodiment.

FIG. 4 illustrates a method 400 in accordance with one embodiment. The method 400 makes further determination for printing the event log under certain conditions and settings. In decision block 402, the method 400 determines if there is a saved event log in the internal non-volatile storage. If there is no event log, the method 400 ends. If there is a saved event log, the method 400 moves to decision block 404 and determines whether log-printing is enabled in the printer configurations. If log-printing is not enabled in the configurations, the method 400 moves to decision block 412 to determine if the user wishes to override the settings to allow log-printing. If the user overrides the settings, then the method 400 moves to block 406 and begins the process of printing the log. If the user does not override the settings, the method 400 moves to block 410 and deletes the saved event log. If the log-printing is enabled in the configurations, the method 400 moves to block 406 and checks if there is paper in at least one of the input trays of the printer or multi-function printer. With paper present in the input tray, the method 400 moves to block 408 to print as many log pages as specified by the 'page limit' setting value of the configurations. Fewer pages may be printed if the saved event log is shorter than the 'page limit' setting. The method 400 then moves to block 410 after the pages have been printed.

Figure 5:
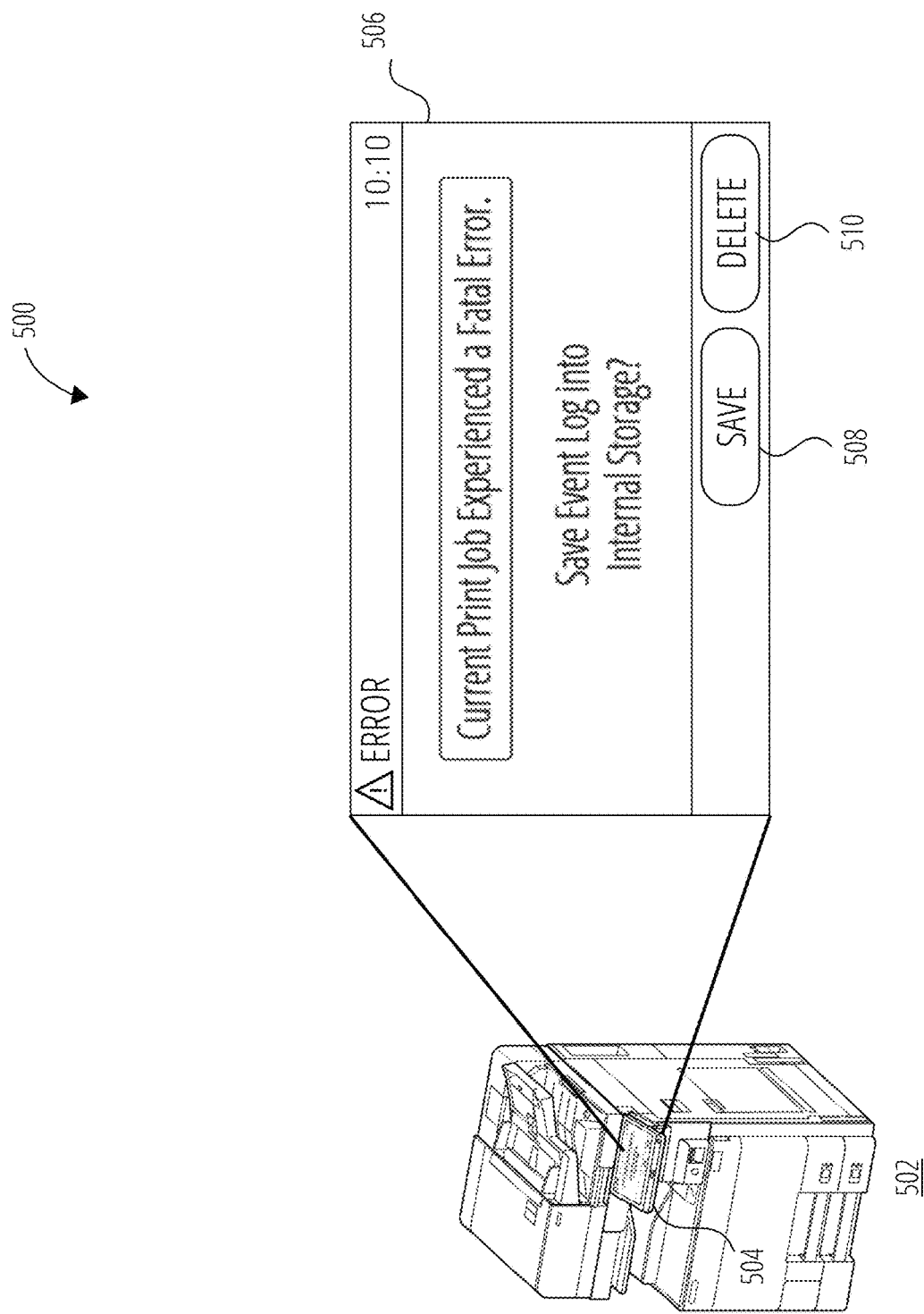
FIG. 5 illustrates a printing system 500 in accordance with one embodiment.

FIG. 5 illustrates a printing system 500 in accordance with one embodiment. The printing system 500 comprises a printer or multi-function printer 502 with a display unit 504 displaying an error screen 506. The printing system 500 constructs a User Interface including the error screen 506. The error screen 506 is shown to a user following a fatal error in a print job and under the condition that there is enough storage capacity to save the event log in the internal non-volatile storage. The error screen 506 informs the user of the fatal error and requests whether the user wishes to save the event log within the internal non-volatile storage. These options are presented to the user as a 'Save' option (input option 508) and a 'Cancel' option (input option 510).

Figure 6:
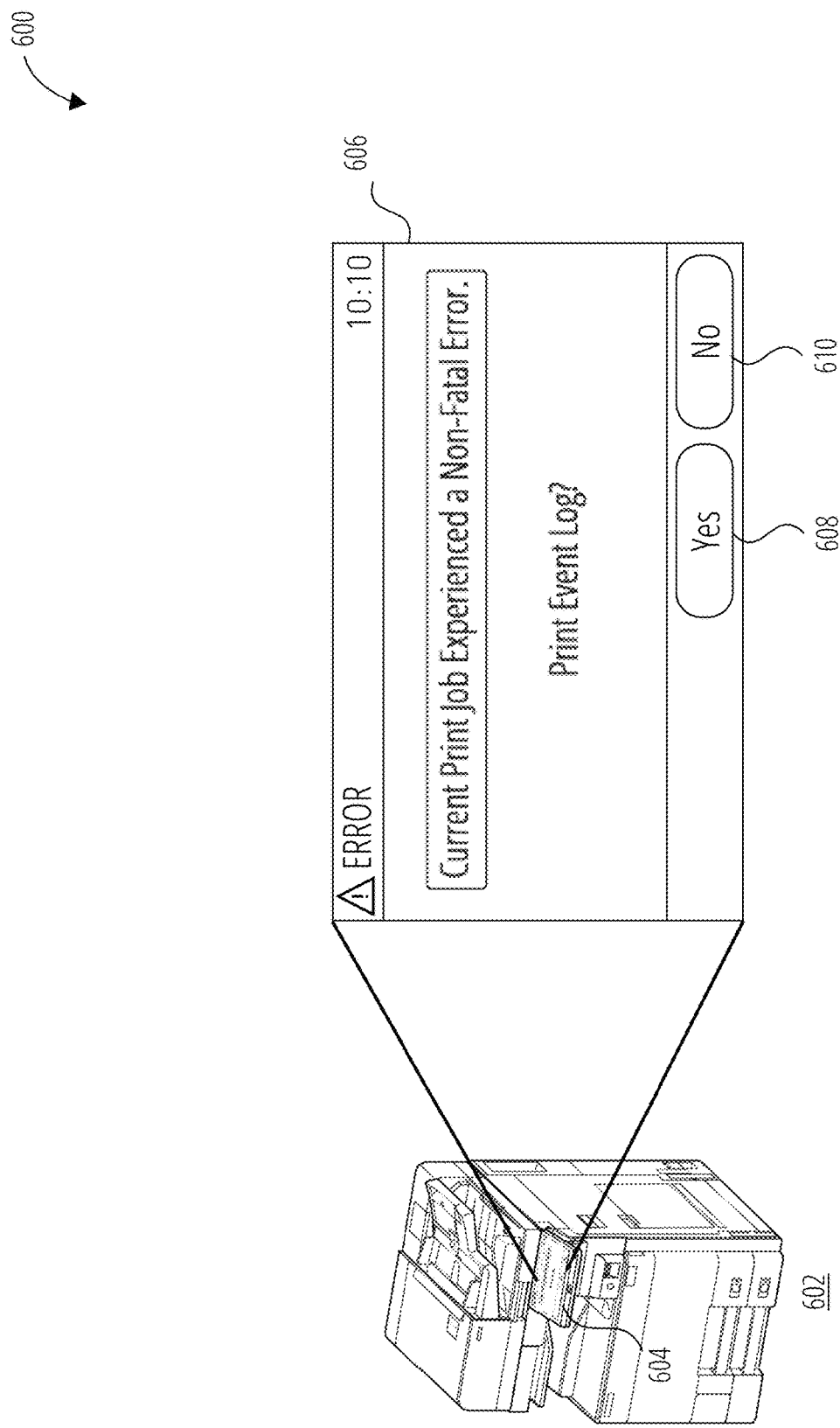
FIG. 6 illustrates printing system 600 in accordance with one embodiment.

FIG. 6 illustrates a printing system 600 in accordance with one embodiment. The printing system 600 comprises a printer or multi-function printer 602 with a display unit 604 displaying an error screen 606. The printing system 600 constructs a User Interface including the error screen 606. The error screen 606 is shown to a user following a print error in a print job that is not a fatal error. The error screen 606 informs the user of the print error and requests whether the user wishes to print the event log. These options are presented to the user as a 'Yes' option (input option 608) and a 'No' option (input option 610).

Figure 7:
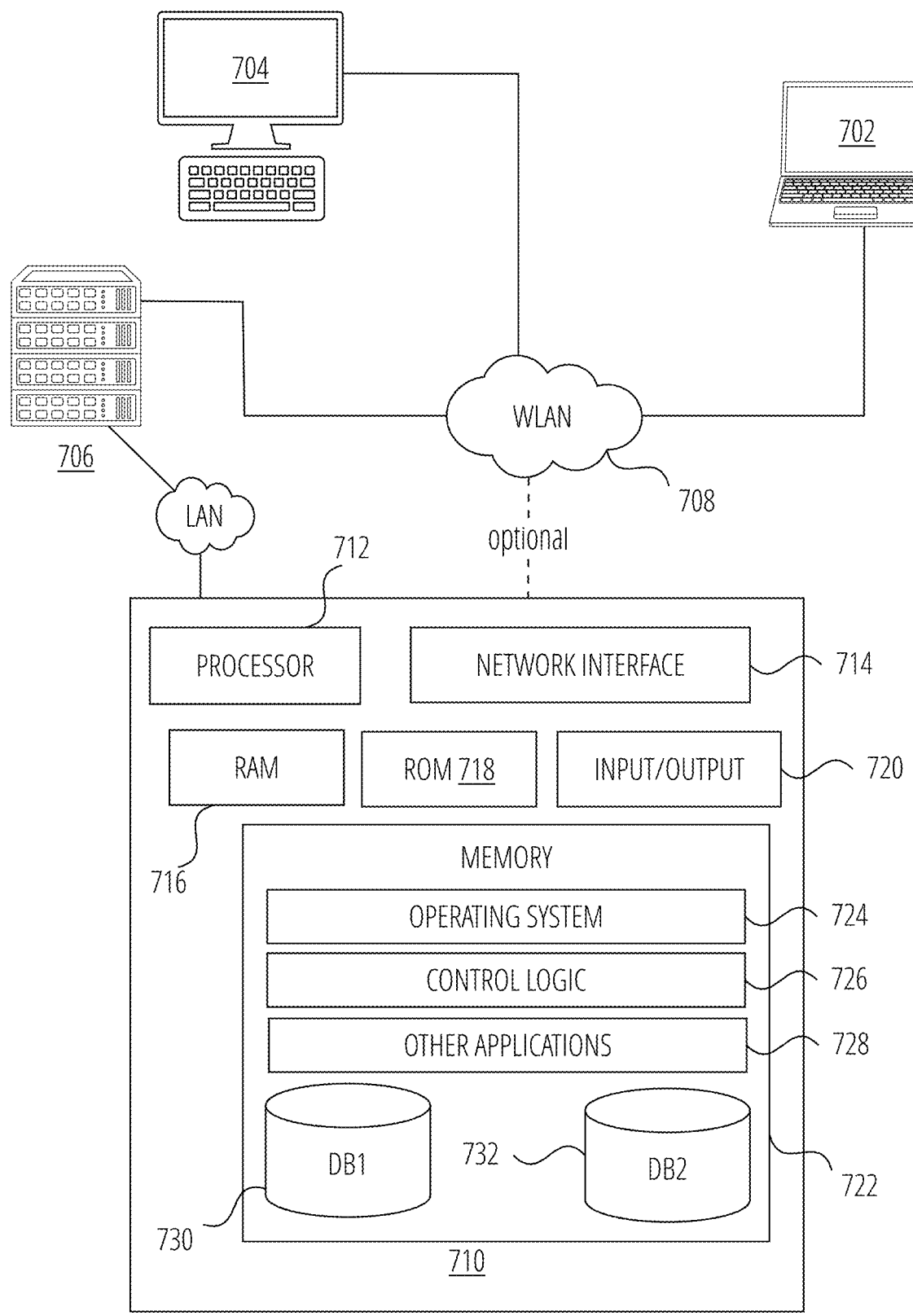
FIG. 7 depicts an illustrative computer system architecture that may be used in accordance with one or more illustrative aspects described herein.

FIG. 7 illustrates one example of a system architecture and data processing device that may be used to implement one or more illustrative aspects described herein in a standalone and/or networked environment. Various network nodes data server 710, web server 706, computer 704, and laptop 702 may be interconnected via a wide area network 708 (WAN), such as the internet. Other networks may also or alternatively be used, including private intranets, corporate networks, LANs, metropolitan area networks (MANs) wireless networks, personal networks (PANs), and the like. Network 708 is for illustration purposes and may be replaced with fewer or additional computer networks. A local area network (LAN) may have one or more of any known LAN topology and may use one or more of a variety of different protocols, such as ethernet. Devices data server 710, web server 706, computer 704, laptop 702 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 710, web server 706, and client computer 704, laptop 702. Data server 710 provides overall access, control and administration of databases and control software for performing one or more illustrative aspects described herein. Data server data server 710 may be connected to web server 706 through which users interact with and obtain data as requested. Alternatively, data server 710 may act as a web server itself and be directly connected to the internet. Data server 710 may be connected to web server 706 through the network 708 (e.g., the internet), via direct or indirect connection, or via some other network. Users may interact with the data server 710 using remote computer 704, laptop 702, e.g., using a web browser to connect to the data server 710 via one or more externally exposed web sites hosted by web server 706. Client computer 704, laptop 702 may be used in concert with data server 710 to access data stored therein, or may be used for other purposes. For example, from client computer 704, a user may access web server 706 using an internet browser, as is known in the art, or by executing a software application that communicates with web server 706 and/or data server 710 over a computer network (such as the internet).

Servers and applications may be combined on the same physical machines, and retain separate virtual or logical addresses, or may reside on separate physical machines. FIG. 7 illustrates just one example of a network architecture that may be used, and those of skill in the art will appreciate that the specific network architecture and data processing devices used may vary, and are secondary to the functionality that they provide, as further described herein. For example, services provided by web server 706 and data server 710 may be combined on a single server.

Each component data server 710, web server 706, computer 704, laptop 702 may be any type of known computer, server, or data processing device. Data server 710, e.g., may include a processor 712 controlling overall operation of the data server 710. Data server 710 may further include RAM 716, ROM 718, network interface 714, input/output interfaces 720 (e.g., keyboard, mouse, display, printer, etc.), and memory 722. Input/output interfaces 720 may include a variety of interface units and drives for reading, writing, displaying, and/or printing data or files. Memory 722 may further store operating system software 724 for controlling overall operation of the data server 710, control logic 726 for instructing data server 710 to perform aspects described herein, and other application software 728 providing secondary, support, and/or other functionality which may or may not be used in conjunction with aspects described herein. The control logic may also be referred to herein as the data server software control logic 726. Functionality of the data server software may refer to operations or decisions made automatically based on rules coded into the control logic, made manually by a user providing input into the system, and/or a combination of automatic processing based on user input (e.g., queries, data updates, etc.).

Memory 722 may also store data used in performance of one or more aspects described herein, including a first database 732 and a second database 730. In some embodiments, the first database may include the second database (e.g., as a separate table, report, etc.). That is, the information can be stored in a single database, or separated into different logical, virtual, or physical databases, depending on system design. Web server 706, computer 704, laptop 702 may have similar or different architecture as described with respect to data server 710. Those of skill in the art will appreciate that the functionality of data server 710 (or web server 706, computer 704, laptop 702) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc., that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. "Nonvolatile storage device" refers to a type of computer memory that can retrieve stored information even after having been power cycled. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 8:
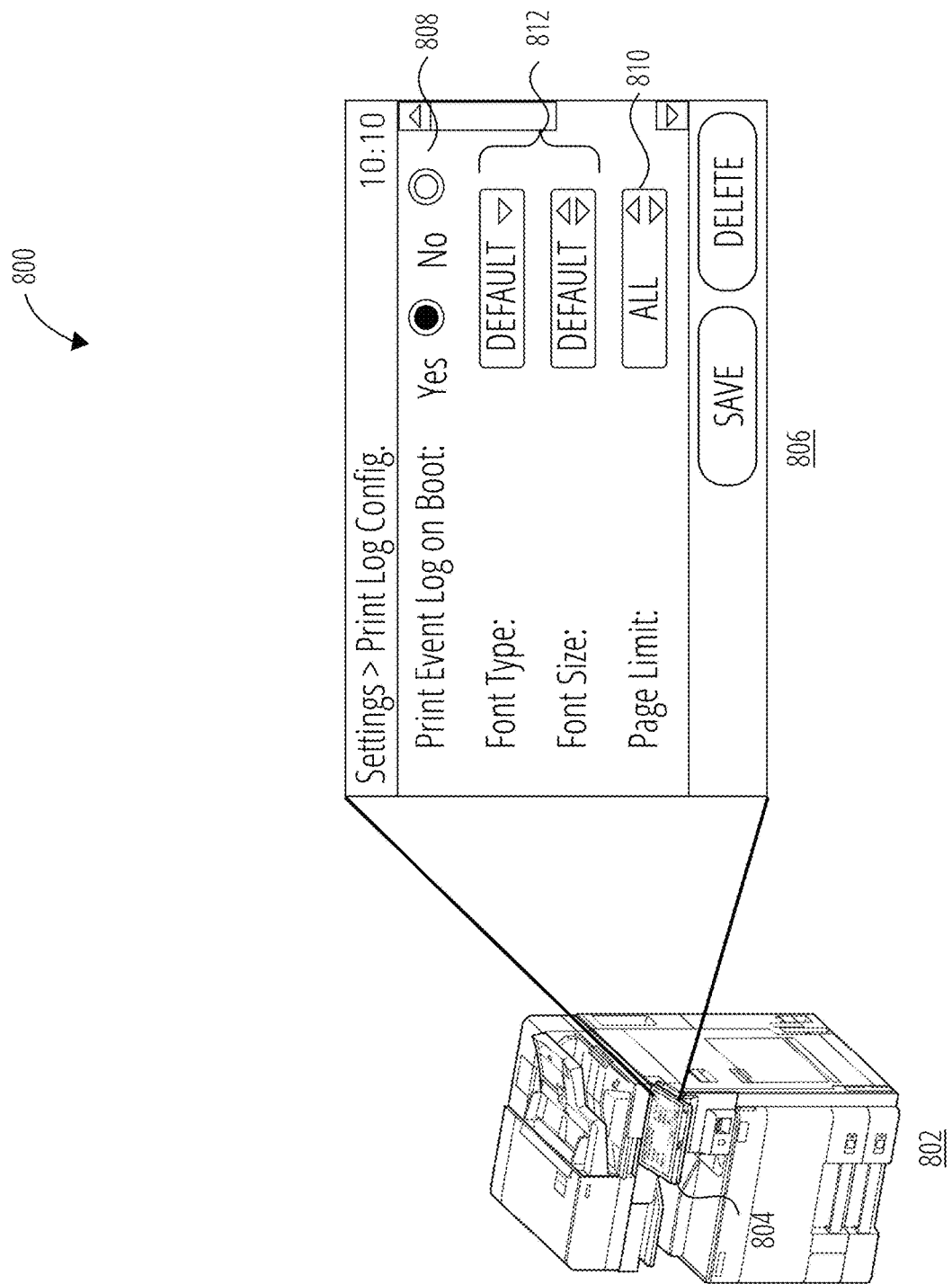
FIG. 8 illustrates a printing system 800 in accordance with one embodiment.

FIG. 8 illustrates a printing system 800 in accordance with one embodiment. The printing system 800 comprises a printer or multi-function printer 802 with a display unit 804 displaying a print log configuration screen 806. The print log configuration screen 806 displays several settings that a user may modify to such as the enable configurations 808, which enables the saved event log to be printed on boot, font configurations 812 which allow a user to specify which font and size of font for the printing of the saved event log, and a page limit settings 810 which is provided for designating the maximum number of pages of the saved event log that should be printed. An additional configuration that may be provided may be based on whether the printer supports duplex printing and if so should it be used when printing logs. Furthermore, additional configurations may be utilized to specify where the saved event log is printed from, which paper tray to use, and if the saved event log is to be communicated to another printer or machines (e.g., email, text, etc.).

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
providing a printer or a multi-function printer with a printer memory buffer and internal non-volatile storage;

receiving a print error, wherein the print error is recorded in an event log;
determining if the print error is a fatal error or a non-fatal error; and
on condition the print error is a non-fatal error:
using the printer or the multi-function printer to print the event log located in the printer memory buffer;
on condition the print error is a fatal error:
determining if there is enough storage capacity to save the event log into
the internal non-volatile storage;
on condition there is enough storage capacity:
saving the event log in the internal non-volatile storage;
triggering construction of a User Interface (UI), the UI instructing a user to power cycle the printer or the multi-function printer.

2. The method of claim 1, further comprising presenting an error screen to the user and requesting an input from the user to print the event log.

3. The method of claim 1, further comprising presenting an error screen to the user and requesting an input from the user to save the event log in the internal non-volatile storage.

4. The method of claim 1, further comprising:
determining, after power cycling the printer or the multi-function printer, if there is a saved event log; and
on condition there is a saved event log and event log printing is enabled on the printer or the multi-function printer:
print the saved event log.

5. The method of claim 4, further comprising determining if there is paper in an input tray of the printer or the multi-function printer.

6. The method of claim 4, furthering comprising printing as many pages of the event log as specified in a page limit setting in a configuration section of the printer or the multi-function printer.

7. The method of claim 4, further comprising deleting the saved event log.

8. The method of claim 4, further comprising:
on condition there is a saved event log and event log printing is not enabled on the printer or the multi-function printer:
enabling event log printing on the printer or the multi-function printer, by the user, using an override function; and
printing the saved event log.

9. A printing apparatus, comprising:
a processor;
a printer memory buffer;
an internal non-volatile storage; and
a memory storing instructions that, when executed by the processor, configure the apparatus to:
receive a print error, wherein the print error is recorded in an event log;
determine if the print error is a fatal error or a non-fatal error; and
on condition the print error is a non-fatal error:
use a printer or a multi-function printer to print the event log located in the printer memory buffer;
on condition the print error is a fatal error:
determine if there is enough storage capacity to save the event log to the internal non-volatile storage;
on condition there is enough storage capacity:
save the event log to the internal non-volatile storage;
trigger the construction of a User Interface (UI), the UI instructing a user to power cycle the printer or the multi-function printer.

10. The printing apparatus of claim 9, wherein the instructions further configure the apparatus to present an error screen to the user and request an input from the user to print the event log.

11. The printing apparatus of claim 9, wherein the instructions further configure the apparatus to present an error screen to the user and request an input from the user to save the event log in the internal non-volatile storage.

12. The printing apparatus of claim 9, wherein the instructions further configure the apparatus to:
determine, after power cycling the printer or the multi-function printer, if there is a saved event log; and
on condition there is a saved event log and event log printing is enabled on the printer or the multi-function printer:
print the saved event log.

13. The printing apparatus of claim 12, wherein the instructions further configure the apparatus to determine if there is paper in an input tray of the printer or the multi-function printer.

14. The printing apparatus of claim 12, furthering comprising printing as many pages of the event log as specified in a page limit setting in a configuration section of the printer or the multi-function printer.

15. The printing apparatus of claim 12, wherein the instructions further configure the apparatus to:
on condition there is a saved event log and event log printing is not enabled on the printer or the multi-function printer:
enable event log printing on the printer or the multi-function printer, by the user, using an override function; and
print the saved event log.

16. A non-transitory computer-readable storage medium, the computer-readable storage medium including instructions that when executed by a printer or a multi-function printer, cause the printer or the multi-function printer to:
receive a print error, wherein the print error is recorded in an event log;
determine if the print error is a fatal error or a non-fatal error; and
on condition the print error is a non-fatal error:
use the printer or the multi-function printer to print the event log located in the printer memory buffer;
on condition the print error is a fatal error:
determine if there is enough storage capacity to save the event log to an internal non-volatile storage;
on condition there is enough storage capacity:
save the event log to the internal non-volatile storage;
trigger the construction of a User Interface (UI), the UI instructing a user to power cycle the printer or the multi-function printer.

17. The computer-readable storage medium of claim 16, wherein the instructions further configure an apparatus to present an error screen to the user and request an input from the user to print the event log.

18. The computer-readable storage medium of claim 16, wherein the instructions further configure the printer or the multi-function printer to present an error screen to the user and request an input from the user to save the event log in the internal non-volatile storage.

19. The computer-readable storage medium of claim 16, wherein the instructions further configure the printer or the multi-function printer to:
- determine, after power cycling the printer or the multi-function printer, if there is a saved event log; and
- on condition there is a saved event log and event log printing is enabled on the printer or the multi-function printer:
  - print the saved event log.

20. The computer-readable storage medium of claim 19, wherein the instructions further configure the printer or the multi-function printer to:
- on condition there is a saved event log and event log printing is not enabled on the printer or the multi-function printer:
  - enable event log printing on the printer or the multi-function printer, by the user, using an override function; and
  - print the saved event log.

* * * * *